(12) United States Patent
Wu et al.

(10) Patent No.: US 7,670,254 B2
(45) Date of Patent: *Mar. 2, 2010

(54) METHOD AND APPARATUS TO MONITOR DEVICES OF A HYDRAULIC CIRCUIT OF AN ELECTRO-MECHANICAL TRANSMISSION

(75) Inventors: Peter E. Wu, Brighton, MI (US); Thyagarajan Sadasiwan, Ypsilanti, MI (US); Ronald L. Shemet, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/626,515

(22) Filed: Jan. 24, 2007

(65) Prior Publication Data

US 2008/0176709 A1    Jul. 24, 2008

(51) Int. Cl.
  B60W 10/02 (2006.01)
  G06G 19/00 (2006.01)
(52) U.S. Cl. .............. 477/5; 477/906; 701/62
(58) Field of Classification Search .......... 477/3, 477/5, 906, 907, 127, 130, 131; 701/62, 701/63
See application file for complete search history.

(56) References Cited

U.S. PATENT DOCUMENTS

| | | | | |
|---|---|---|---|---|
| 5,643,123 A | * | 7/1997 | Jang et al. | 475/119 |
| 5,738,602 A | * | 4/1998 | Morita et al. | 475/127 |
| 5,842,144 A | * | 11/1998 | Coutant et al. | 701/62 |
| 5,957,800 A | * | 9/1999 | Oba et al. | 475/119 |
| 6,022,293 A | * | 2/2000 | Dourra et al. | 477/158 |
| 6,375,591 B1 | * | 4/2002 | Wakahara et al. | 475/119 |
| 6,966,862 B2 | * | 11/2005 | Inuta | 475/119 |
| 7,222,005 B2 | | 5/2007 | Kang et al. | |
| 7,426,854 B2 | * | 9/2008 | Endo et al. | 73/115.02 |
| 2005/0080527 A1 | * | 4/2005 | Tao et al. | 701/34 |
| 2006/0111213 A1 | | 5/2006 | Bucknor | |
| 2007/0173373 A1 | | 7/2007 | Kinugasa et al. | |
| 2008/0176706 A1 | * | 7/2008 | Wu et al. | 477/5 |
| 2008/0182696 A1 | * | 7/2008 | Sah et al. | 475/117 |

OTHER PUBLICATIONS

USPTO, Prosecution History for U.S. Appl. No. 11/626,449.

* cited by examiner

Primary Examiner—Roger Pang

(57) ABSTRACT

A method and an apparatus are provided to control operation of an electro-mechanical transmission device selectively operative in one of a plurality of fixed gear modes and two continuously variable modes. The method comprises controlling the flow control devices of the electro-hydraulic control circuit, and monitoring a plurality of pressure monitoring devices in the electro-hydraulic control circuit. A fault is identified in the electro-hydraulic control circuit when a signal output of one of the pressure monitoring devices does not correspond to an expected signal output for the pressure monitoring device after an elapsed time period.

18 Claims, 3 Drawing Sheets

METHOD AND APPARATUS TO MONITOR DEVICES OF A HYDRAULIC CIRCUIT OF AN ELECTRO-MECHANICAL TRANSMISSION

TECHNICAL FIELD

This invention pertains generally to control systems for electro-mechanical transmissions, and more specifically to monitoring operation of a hydraulic circuit thereof.

BACKGROUND OF THE INVENTION

Fuel/electric hybrid powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from an internal combustion engine, and an output member for delivering motive torque from the transmission to the vehicle driveline. Exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit, including electrically-actuated hydraulic flow management valves, pressure control solenoids, and pressure monitoring devices controlled by a control module.

Engineers implementing powertrain systems having electro-hydraulic transmissions are tasked with schemes to identify a fault in the hydraulic circuit, such as during execution of a shift.

SUMMARY OF THE INVENTION

There is provided a method and an apparatus to identify a fault in an electro-hydraulic circuit for a transmission device of an exemplary powertrain. The transmission comprises an electro-mechanical device operative to transmit torque input from a plurality of torque-generative devices. An electro-hydraulic control circuit comprising a plurality of controllable flow control devices is operative to selectively actuate a plurality of torque-transfer devices to effect operation in one of a plurality of operating modes comprising fixed gear ratio modes and two continuously variable modes. The method comprises controlling the flow control devices, and monitoring a plurality of pressure monitoring devices in the electro-hydraulic control circuit. A fault is identified in the electro-hydraulic control circuit when a monitored signal output from one of the pressure monitoring devices does not correspond to an expected signal output for the pressure monitoring device after an elapsed time period.

The invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT OF THE INVENTION

Figure 1:
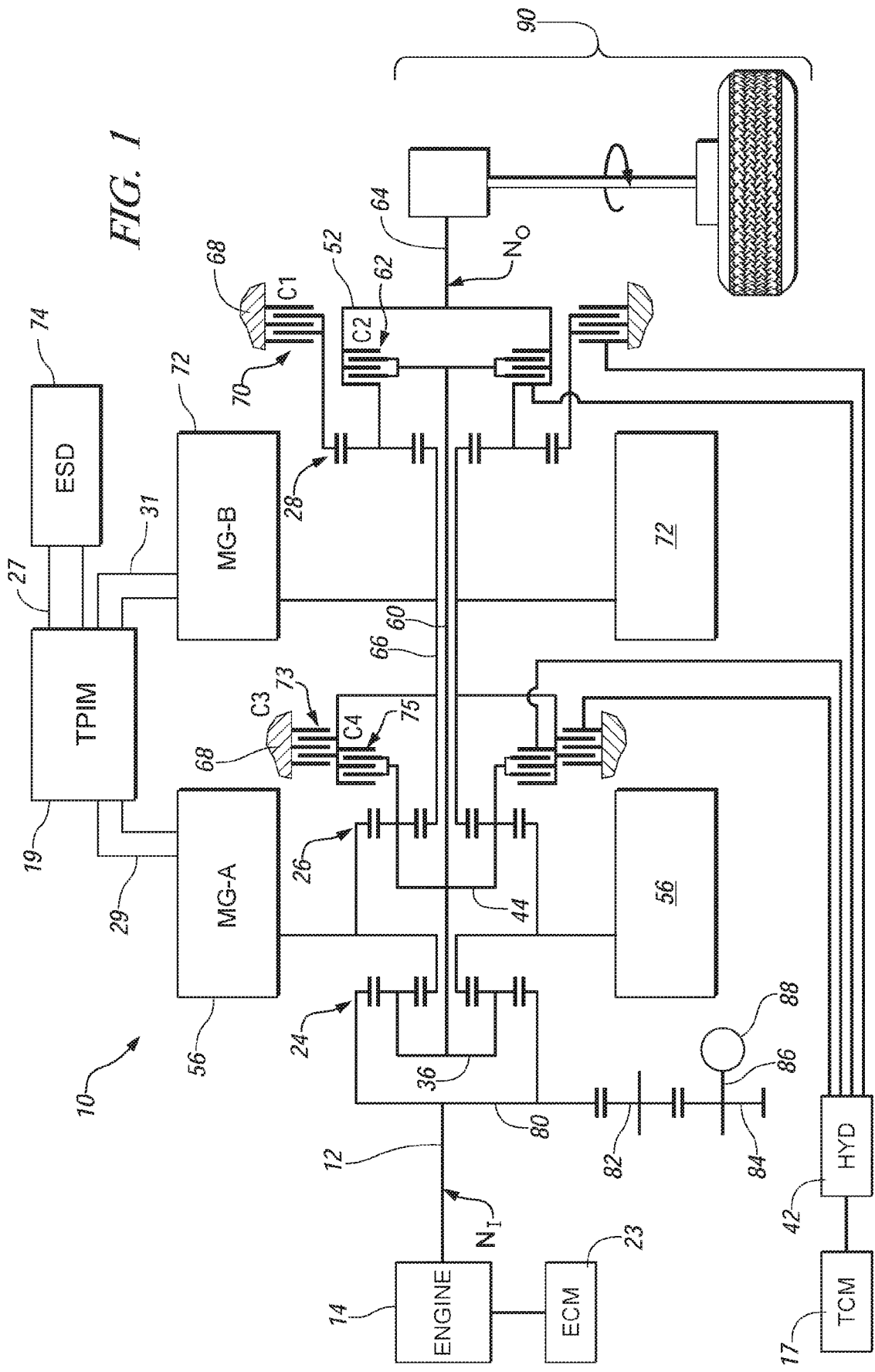
FIG. 1 is a schematic diagram of an exemplary powertrain, in accordance with the present invention.
Figure 2:
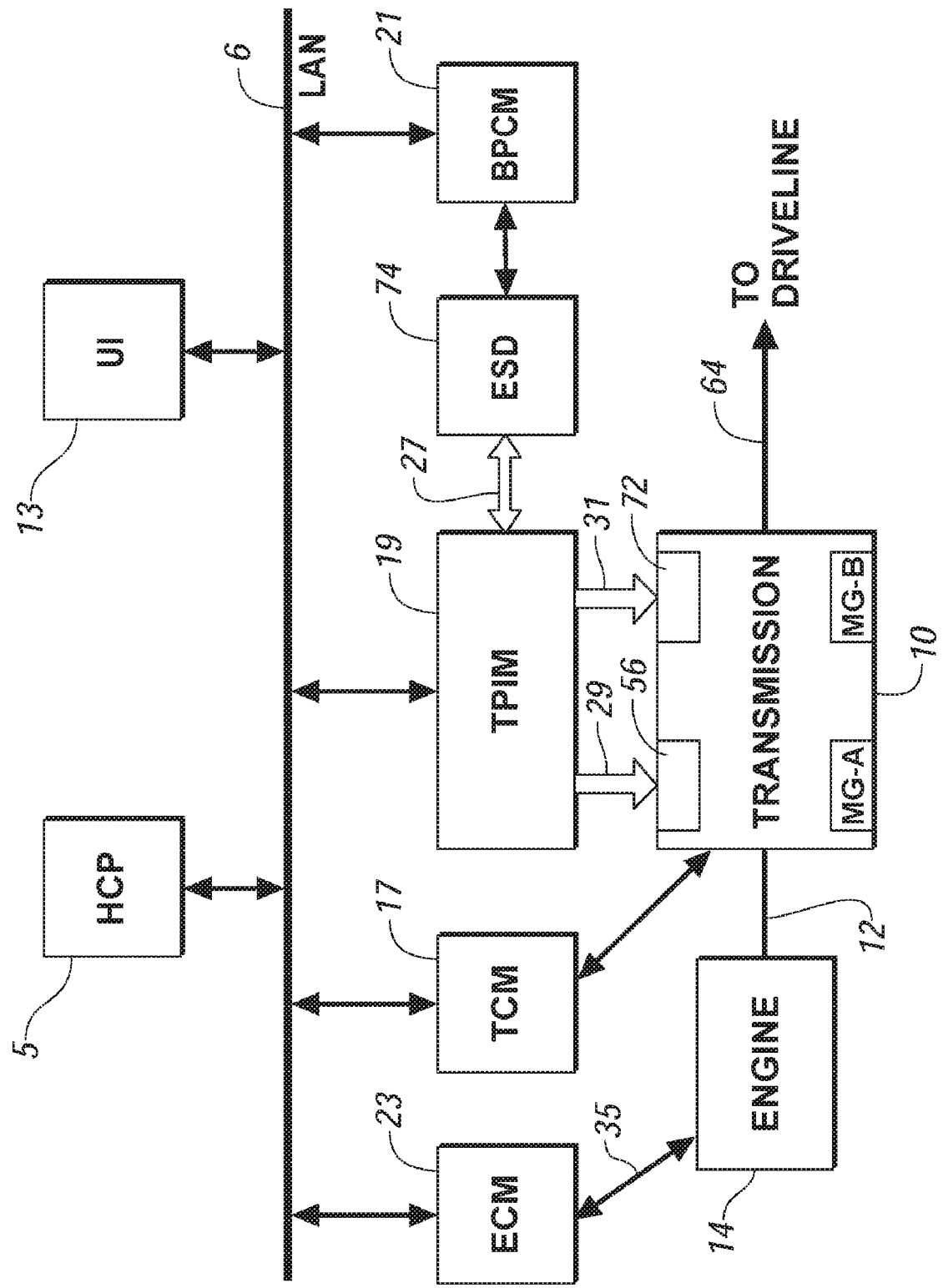
FIG. 2 is a schematic diagram of an exemplary architecture for a control system and powertrain, in accordance with the present invention; and, FIG. 3 is a schematic diagram of a hydraulic circuit, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953, 409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an internal combustion engine 14. The transmission 10 utilizes three planetary-gear sets 24, 26 and 28, and four torque-transmitting devices, i.e. clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A and MG-B 56 and 72 are preferably coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque. Each clutch is preferably hydraulically actuated, receiving pressurized hydraulic fluid from a pump, described below, via an electro-hydraulic control circuit 42 described hereinbelow with reference to FIG. 3.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more electrochemical energy storage batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e. MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is depicted. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, a transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request, an engine torque command, clutch torque commands for the various clutches C1, C2, C3, C4 of the transmission 10; and motor torque commands for MG-A and MG-B. The TCM is operatively connected to the electro-hydraulic control circuit 42 of FIG. 3, including monitoring various pressure sensing devices (not depicted) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively depicted as aggregate line 35. The ECM 23 receives the engine torque command from the HCP 5, and generates a desired axle torque, and an indication of actual engine torque input to the transmission, which is communicated to the HCP 5. For simplicity, ECM 23 is depicted generally having bi-directional interface with engine 14 via aggregate line 35. Various other parameters that may be sensed by ECM 23 include engine coolant temperature, engine input speed, $N_I$, to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The Transmission Power Inverter Module (TPIM) 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested output torque at shaft 64, also referred to as the operator torque request. Selectively operated components of the transmission 10 are appropriately controlled and manipulated to respond to the operator demand. For example, in the exemplary embodiment depicted in FIGS. 1 and 2, when the operator has selected a forward drive range and manipulates either the accelerator pedal or the brake pedal, the HCP 5 determines an output torque which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The exemplary two-mode, compound-split, electro-mechanical transmission operates in several fixed gear operating modes and continuously variable operating modes, described with reference to FIG. 1, and Table 1, below.

TABLE 1

| Transmission Operating Mode | Actuated Clutches | |
|---|---|---|
| Mode I | C1 70 | |
| Fixed Ratio 1 (GR1) | C1 70 | C4 75 |
| Fixed Ratio 2 (GR2) | C1 70 | C2 62 |
| Mode II | C2 62 | |
| Fixed Ratio 3 (GR3) | C2 62 | C4 75 |
| Fixed Ratio 4 (GR4) | C2 62 | C3 73 |

The various transmission operating modes described in the table indicate which of the specific clutches C1, C2, C3, and C4 are engaged or actuated for each operating mode. Additionally, in various transmission operating modes, MG-A and MG-B may each operate as electrical motors to generate motive torque, or as a generator to generate electrical energy. A first mode, or gear train, is selected when clutch C1 70 is actuated in order to "ground" the outer gear member of the third planetary gear set 28. A second mode, or gear train, is selected when clutch C1 70 is released and clutch C2 62 is actuated to connect the shaft 60 to the carrier of the third planetary gear set 28. Other factors outside the scope of the invention affect when the electrical machines 56, 72 operate as motors and generators, and are not discussed herein.

The control system, depicted primarily in FIG. 2, is operable to provide a range of transmission output speeds at shaft 64 from relatively slow to relatively fast within each operating mode. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the operating modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission operating mode. Certain ranges of operation are described below in which fixed ratios are achieved by applying an additional clutch. This additional clutch may be clutch C3 73 or C4 75, as shown in the table, above.

When the additional clutch is applied, fixed ratio operation of input-to-output speed of the transmission, i.e. $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Figure 3:
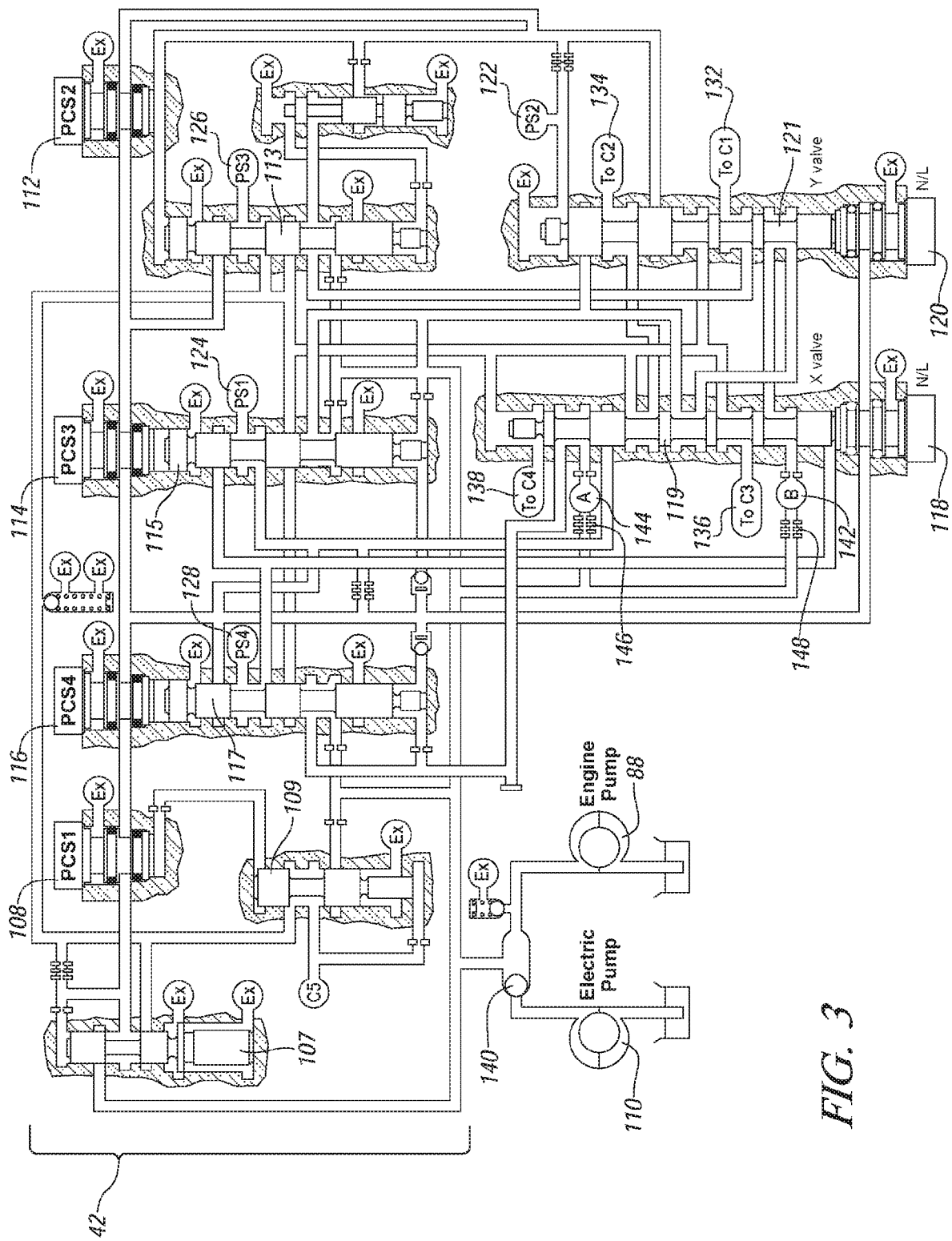

Referring to FIG. 3, a schematic diagram is depicted which provides a more detailed description of the exemplary electro-hydraulic system for controlling flow of hydraulic fluid in the exemplary transmission. The main hydraulic pump 88, driven off the input shaft from the engine 10, and auxiliary pump 110, operatively electrically controlled by the TPIM 19, provide pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, cooling circuits for machines A and B, and a circuit for cooling and lubricating the transmission 10 via passages 142, 144 (not depicted in detail). As previously stated, the TCM 17 is preferably operable to actuate the various clutches to achieve various transmission operating modes through selective actuation of hydraulic circuit flow control devices comprising pressure control solenoids ('PCS') PCS1 108, PCS2 112, PCS3 114, PCS4 116 and solenoid-controlled flow management valves X-valve 118 and Y-valve 120. The circuit is fluidly connected to pressure switches PS1, PS2, PS3, and PS4 via passages 124, 122, 126, and 128, respectively. The pressure control solenoid PCS1 108 has control positions of neutral and high and is operative to provide modulation of fluidic pressure in the hydraulic circuit through fluidic interaction with valve 109. Pressure control solenoid PCS2 112 has control positions of neutral and low, and is fluidly connected to spool valve 113 and operative to effect flow therethrough when actuated. Spool valve 113 is fluidly connected to pressure switch PS3 via passage 126. Pressure control solenoid PCS3 114 has control positions of neutral and high, and is fluidly connected to spool valve 115 and operative to effect flow therethrough when actuated. Spool valve 115 is fluidly connected to pressure switch PS1 via passage 124. Pressure control solenoid PCS4 116 has control positions of neutral and low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states reference positions of each valve effecting flow control to different devices in the hydraulic circuit 42 and the transmission 10. The X-valve 119 is operative to direct pressurized fluid to clutches C3 and C4 and cooling systems for stators of MG-A and MG-B via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. A more detailed description of the exemplary electro-hydraulic control circuit 42 is provided in commonly assigned U.S. patent application Ser. No. 11/263,216, entitled "A Multiplexed Pressure Switch System for an Electrically Variable Hybrid Transmission", which is incorporated herein by reference.

An exemplary logic table to accomplish control of the electro-hydraulic control circuit 42 is provided with reference to Table 2, below.

TABLE 2

| Operating State | X-Valve Logic No Latch | Y-Valve Logic C2 Latch | PCS1 Neutral/ High | PCS2 Neutral/ High | PCS3 Neutral/ High | PCS4 Neutral/ Low |
|---|---|---|---|---|---|---|
| Mode I | 0 | 0 | Line Modulation | MG-B Stator Cooling | C1 | MG-A Stator Cool |
| Mode II | 0 | 1 | Line Modulation | C2 | MG-B Stator Cooling | MG-A Stator Cooling |
| Low Range | 1 | 0 | Line Modulation | C2 | C1 | C4 |
| High Range | 1 | 1 | Line Modulation | C2 | C3 | C4 |

Referring to Tables 1 and 2, the low range operating state includes selective actuation of clutches C2, C1, and C4, facilitating operation in any one of continuously variable Mode I, and fixed gears GR1, GR2, and GR3. The high range operating state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

An exemplary table comprising expected signal output states of the pressure switches PS1, PS2, PS3, and PS4 in the exemplary electro-hydraulic control circuit 42 is provided with reference to Table 3, below, for various transmission operating modes. Each of the pressure switches PS1, PS2, PS3, PS4 have hydraulic output states of 0=Off and 1=On, wherein the state transition occurs at a threshold appropriate to the hydraulic circuit. In this embodiment, the state transition preferably occurs at about 140 kPa (50 psi), meaning that output state of each pressure switch is "0" or Off when the monitored hydraulic pressure is less than 140 kPa and the output state of each pressure switch is "1" or On when the monitored hydraulic pressure is greater than 140 kPa. 'LM' indicates the PCS1 is used for line pressure modulation.

TABLE 3

| Operating Mode | X Logic Valve (N/L) | Y Logic Valve (N/L) | Pressure Switch Hydraulic State (0-Off/1-On) PS1/PS2/ PS3/PS4 | PCS1 N/H | PCS2 N/H | PCS3 N/H | PCS4 N/L |
|---|---|---|---|---|---|---|---|
| Elec Low | 0 | 0 | 1000 | LM | B Stator | C1 (On) | A Stator |
| Reverse | 0 | 0 | 1000 | LM | C2 (Off) | C1 (On) | C4 (Off) |

TABLE 3-continued

| Operating Mode | X Logic Valve (N/L) | Y Logic Valve (N/L) | Pressure Switch Hydraulic State (0-Off/1-On) PS1/PS2/ PS3/PS4 | PCS1 N/H | PCS2 N/H | PCS3 N/H | PCS4 N/L |
|---|---|---|---|---|---|---|---|
| Neutral | 0 | 0 | 0000 | LM | B Stator Off | C1 (Off) | A Stator Off |
| Mode I | 0 | 0 | 1000 | LM | B Stator Off | C1 (On) | A Stator Off |
| GR1 | 1 | 0 | 1001 |  | C2 (Off) | C1 (On) | C4 (On) |
| GR2 | 1 | 0 | 1010 |  | C2 (On) | C1 (On) | C4 (Off) |
| GR3 Lo Range | 1 | 0 | 0011 |  | C2 (On) | C1 (Off) | C4 (On) |
| GR3 Hi Range | 1 | 1 | 0111 |  | C2 (On) | C3 (Off) | C4 (On) |
| GR4 | 1 | 1 | 1110 |  | C2 (On) | C3 (On) | C4 (Off) |
| Mode II | 0 | 1 | 0110 |  | C2 (On) | B Stator Off | A Stator Off |

Selective control of the X- and Y-valves and actuation of the solenoids PCS2, PCS3, and PCS4 facilitate flow of hydraulic fluid to actuate clutches C1, C2, C3, and C4, and provide cooling for the stators of MG-A and MG-B.

In operation, a shift occurs in the exemplary transmission due to a variety of operating characteristics of the powertrain. There may be a change in demand for an operator demand for torque. Such demands are typically communicated through inputs to the UI 13 as previously described. Additionally, a change in demand for output torque may be predicated on a change in external conditions, including, e.g., changes in road grade, road surface conditions, or wind load. A shift change may be predicated on a change in powertrain torque demand caused by a control module command to change one of the electrical machines between electrical energy generating mode and torque generating mode. A shift change may be predicated on a change in an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and there can be changes in system optimization that compel a shift change in order to optimize system efficiencies to improve fuel economy and manage battery charging. Furthermore, a shift change may be predicated upon a fault in a component or system. The distributed control module architecture acts in concert to determine a need for a change in the transmission operating mode, and executes the forgoing to effect the change in transmission operation. A shift change in the exemplary system comprises one of at least three possible situations. There can be a shift from one fixed gear to a second fixed gear. There can be a shift from a fixed gear to one of the continuously variable modes. There can be a shift from one of the continuously variable modes to a fixed gear.

The invention described herein is executed in the exemplary system described with reference to FIGS. 1-3 wherein a preferred operating mode is determined by the control system and specific clutches are actuated in accordance with Table 1 to achieve the preferred operating mode. The electro-hydraulic circuit is controlled in accordance with Table 2 to actuate the specific clutches. The expected output states for the pressure switches PS1, PS2, PS3, and PS4 are monitored in accordance with Table 3. A fault is identified with one of the hydraulic circuit flow control devices when a signal output of one of the pressure monitoring devices does not correspond to an expected signal output for the pressure monitoring device, as determined after an elapsed period of time, as detailed in Table 3.

By way of example, when the exemplary transmission is operating in GR1, clutches C1 and C4 are actuated. In this instance, the X-valve 118 is commanded to High state, or "1", the Y-valve 120 is commanded to Low state, or "0", PCS2 solenoid 112 is commanded off, PCS3 solenoid 114 is commanded on, and PCS4 solenoid 116 is commanded on. The output states of the pressure switches are PS1=1, PS2=0, PS3=0, and PS4=1. A fault is identified in the hydraulic circuit when any one of the output states of the pressure switches does not match the expected state, i.e., when any one of the following is true: PS1=0, PS2=1, PS3=1, or PS4=0, after an elapsed time of one second, for this example. Other examples become apparent on reading Tables 1, 2, and 3.

A fault can be identified in the electro-hydraulic control circuit related to a clutch actuation event, a clutch deactivation event, or a clutch slippage event during a shift or vehicle launch. During a clutch actuation event, a fault is preferably identified in the hydraulic circuit when any one of the output states of the pressure switches does not match the expected state after an elapsed time of about 150 milliseconds. During a clutch deactivation event, a fault is preferably identified in the hydraulic circuit when any one of the output states of the pressure switches does not match the expected state after an elapsed time of about one second. During a clutch slippage event, a fault is preferably identified in the hydraulic circuit when any one of the output states of the pressure switches does not match the expected state after an elapsed time of about two seconds.

A fault can comprise, for example, a fault in the control system, a fault in a wiring harness connecting the devices of the hydraulic circuit to the control system, a fault in one of the pressure switches, and a fault in one of the pressure control solenoids and flow management valves.

Identifying a fault in the electro-hydraulic control circuit preferably includes isolating location the fault to one of the hydraulic circuit devices when a signal output of one of the pressure monitoring devices does not correspond to an expected signal output. This facilitates root cause detection of the fault to permit effective continued operation and servicing of the system.

An example of a method to identify and isolate a fault includes a situation wherein the transmission is operating in a fixed gear mode, and a signal is sent to deactivate an off-going clutch by selectively deactivating one of the pressure control solenoids, e.g. from fixed gear GR1 to continuously variable Mode I. The hydraulic circuit elements are changed accordingly to deactivate clutch C4, and outputs of the pressure switches are monitored thereafter. In this example, the outputs of the pressure switches should change from PS1/PS2/PS3/PS4=1/0/0/1 to PS1/PS2/PS3/PS4=1/0/0/0. If the output of the pressure switches remains unchanged, the control system is operable to monitor slippage of the off-going clutch by comparing the input speed, $N_I$, to the output speed multiplied by the fixed gear ratio, e.g. $N_O$*GR1, when in the first fixed gear GR1. A fault related to the selectively deactivated pressure control solenoid, in this instance PCS4 for clutch C4, is identified when the slippage of the off-going clutch does not exceed a minimum threshold, e.g. about 300 RPM and based upon allowable measurement error, after an elapsed time of one second. A fault related to the pressure monitoring device is identified when the slippage of the off-going clutch exceeds the minimum threshold after the elapsed time.

When a fault is identified in the electro-hydraulic control circuit, the control system can command operation of the transmission into a restricted operating mode, including operating in one of the two continuously variable operating modes. The fault can be subsequently verified through further action. The control system then preferably notifies the vehicle operator of the fault, including illuminating the service lamp on the instrument panel in the vehicle.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to identify a fault in a hydraulic circuit of a torque transmission device selectively operative in one of a plurality of operating modes comprising fixed gear modes and two continuously variable modes through selective actuation of a plurality of torque-transfer clutches, the method comprising:
controlling a plurality of flow control devices of the hydraulic circuit;
monitoring a plurality of pressure monitoring devices in the hydraulic circuit; and,
identifying a fault in the hydraulic circuit when a monitored signal output from any one of the pressure monitoring devices does not correspond to an expected signal output for the pressure monitoring device after an elapsed time period comprising isolating the fault, comprising
selectively deactivating one of the flow control devices, monitoring slippage of an off-going clutch,
identifying a fault related to the selectively deactivated flow control device when the slippage of the off-going clutch does not exceed a minimum threshold, and
identifying a fault related to the pressure monitoring device when the slippage of the off-going clutch exceeds the minimum threshold.

2. The method of claim 1, wherein controlling the plurality of flow control devices of the hydraulic circuit further comprises one of selectively actuating one of the flow control devices and selectively deactivating one of the flow control devices.

3. The method of claim 2, wherein selectively actuating one of the flow control devices actuates an oncoming torque-transfer clutch.

4. The method of claim 2, wherein selectively deactivating one of the flow control devices deactivates an off-going torque-transfer clutch.

5. The method of claim 1, further comprising:
selectively actuating one of the flow control devices to effect actuation of one of the torque-transfer clutches; and,
identifying a fault in the hydraulic control circuit when a monitored signal output of one of the pressure monitoring devices does not correspond to an expected signal output after an elapsed time period of about 150 milliseconds.

6. The method of claim 1, further comprising:
selectively deactivating one of the flow control devices to effect deactivation of one of the torque-transfer clutches; and,
identifying a fault in the hydraulic control circuit when a monitored signal output of one of the pressure monitoring devices does not correspond to an expected signal output after an elapsed time period of about one second.

7. The method of claim 1, further comprising commanding operation of the torque transmission device into a restricted operating mode when a fault is identified in the hydraulic control circuit.

8. The method of claim 7 wherein the restricted operating mode comprises one of the two continuously variable operating modes.

9. Transmission, operative to transmit torque from a plurality of torque-generative devices, comprising:
a plurality of torque-transfer clutches;
an hydraulic control circuit, comprising: a plurality of flow control devices effective to selectively actuate the torque-transfer clutches to operate the transmission in one of a plurality of operating modes comprising fixed gear ratio modes and two continuously variable modes, and, a plurality of pressure monitoring devices; and,
a control system:
adapted to control the flow control devices of the hydraulic control circuit; and,
adapted to execute a computer program encoded therein effective to monitor the flow control devices, the computer program comprising:
code to monitor signal outputs of the pressure monitoring devices; and
code to identify a fault in the hydraulic control circuit when a monitored signal output from one of the pressure monitoring devices does not correspond to an expected signal output for the pressure monitoring device after an elapsed time period comprising
code to isolate the fault, comprising
code to deactivate an off-going clutch by selectively deactivating one of a first, second, and third pressure control solenoids and a first and second flow management valves,
code to monitor slippage of the off-going clutch,
code to identify a fault related to the selectively deactivated pressure control solenoid when the slippage of the off-going clutch exceeds a minimum threshold, and code to identify a fault related to the pressure switch device when the slippage of the off-going clutch does not exceed the minimum threshold.

10. The transmission of claim 9, wherein the flow control devices of the hydraulic control circuit comprise first, second, and third pressure control solenoids and first and second flow management valves.

11. The transmission of claim 9, wherein the pressure monitoring devices comprise first, second, third, and fourth pressure switch devices.

12. The transmission of claim 11, further comprising code to identify a fault associated with the first pressure control solenoid when the signal output from the third pressure monitoring device does not correspond to an expected signal output.

13. The transmission of claim 11, further comprising code to identify a fault associated with the second pressure control solenoid when the signal output from the first pressure monitoring device does not correspond to an expected signal output.

14. The transmission of claim 11, further comprising code to identify a fault associated with the third pressure control solenoid when the signal output from the fourth pressure monitoring device does not correspond to an expected signal output.

15. The transmission of claim 11, further comprising code to identify a fault associated with the first flow management valve when either of the signal outputs of the third and fourth pressure monitoring devices fails to change output state when the first flow management valve is commanded from a first position to a second position.

16. The transmission of claim 11, further comprising code to identify a fault associated with the second flow management valve when the signal output of the second pressure monitoring device does not correspond to an expected signal output when the first flow management valve is commanded in either of a first position and a second position.

17. The transmission of claim 9, further comprising the control system adapted to command operation of the transmission into a restricted operating mode when a fault is identified in the hydraulic control circuit.

18. The transmission of claim 17, wherein the restricted operating mode comprises one of the two continuously variable operating modes.

* * * * *